United States Patent
Omori et al.

[11] Patent Number: 5,829,936
[45] Date of Patent: Nov. 3, 1998

[54] FLUSH-MOUNTED PLUG FOR FILLING A THREADED HOLE

[75] Inventors: Toshiaki Omori, Owariasahi; Eiji Inoue, Tokoname; Takuya Fujiwara, Komaki, all of Japan

[73] Assignee: Okuma Corporation, Aichi-ken, Japan

[21] Appl. No.: 878,407

[22] Filed: Jun. 18, 1997

[30] Foreign Application Priority Data

Jun. 18, 1996 [JP] Japan ................................... 8-157154

[51] Int. Cl.$^6$ ............................ F16B 13/04; F16B 19/00
[52] U.S. Cl. ............................ 411/509; 411/324; 411/913
[58] Field of Search .................................. 411/377, 431, 411/508, 509, 510, 910, 913, 324

[56] References Cited

U.S. PATENT DOCUMENTS

| | | | |
|---|---|---|---|
| 3,476,165 | 11/1969 | Vaughn | 411/913 X |
| 3,628,816 | 12/1971 | Ross, Jr. | 411/913 X |
| 3,651,734 | 3/1972 | McSherry | 411/913 X |
| 4,112,815 | 9/1978 | Tanaka | 411/913 X |
| 5,098,239 | 3/1992 | Thiel | 411/377 |
| 5,433,571 | 7/1995 | Allison | 411/913 X |

FOREIGN PATENT DOCUMENTS 48-20877  3/1973  Japan .
57-31451  2/1982  Japan .

*Primary Examiner*—Neill R. Wilson
*Attorney, Agent, or Firm*—Lahive & Cockfield, LLP

[57] ABSTRACT

A resin flush-mounted plug (11) for insertion into an internally threaded hole (1) with a countersink (2) formed in a pallet of a machine tool has a head (12) for filling the countersink (2) of the threaded hole (1) and a pair of legs (13) formed integrally with the head (12) for fitting into an internally threaded portion (3) of the threaded hole (1). The head (12) has a tapered under surface (12a) for filling the countersink (2) of the threaded hole (1). Also provided in the head (12) is a slot (12b), a hexagonal hole, or some other recess for accommodating a screwdriver blade, a wrench, or some other appropriate tool used to remove the flush-mounted plug (11). The legs (13) project outward radially from the underside of the head (12). The outer peripheral surfaces of the fixed ends of the legs (13) to the head (12) are arranged on a circumference whose diameter is smaller than the inner diameter C of the internally threaded portion (3) (A<C with A the diameter of the circumference). Furthermore, the outer peripheral surfaces of the free ends of the legs are arranged on a circumference whose diameter is larger than the inner diameter C and smaller than the outer diameter D of the countersink (2) (C<B<D with B the diameter of the circumference).

13 Claims, 6 Drawing Sheets

FLUSH-MOUNTED PLUG FOR FILLING A THREADED HOLE

BACKGROUND OF THE INVENTION

1. Field of the Invention

The present invention relates to a flush-mounted plug for filling an unused threaded hole in order to protect the hole from entry of foreign matter.

2. Description of the Related Art

Flush-mounted plugs have conventionally been used to fill unused threaded holes of equipment and devices of various types. With reference to FIG. 9, a table or pallet P of a machine tool has across its entire top surface a number of threaded holes 1 in one of which a tool or a workpiece is set. Meanwhile, all the other threaded holes 1 must be filled with flush-mounted plugs to protect the holes 1 from foreign matter such as chips, dust, and cutting fluid.

FIGS. 10 and 11 show two types of flush-mounted plugs known in the art. With particular reference to FIG. 10, numeral 31 generally designates a flush-mounted plug comprising a head 32 to fit in the countersink 2 of the threaded hole 1 and an externally threaded shank 33 for engaging an internally threaded portion 3 of the hole 1.

Referring now to FIG. 11, reference numeral 35 generally designates the other example of a flush-mounted plug having a large head 36 to fit in a large-diameter portion 6 of a stepped threaded hole 5 and an externally threaded shank 37 for engaging an internally threaded portion 7 of the threaded hole 5.

However, these conventional flush-mounted plugs suffer from the disadvantages of high manufacturing cost due to the need for forming the external threads on the shanks 33 and 37 and the time consuming and troublesome job of screwing these threaded plugs into numerous unused holes. Thus, there has existed a long-standing need in the art to provide a better flush-mounted plug free of the above-described drawbacks.

SUMMARY OF THE INVENTION

It is accordingly an object of the present invention to provide a less costly flush-mounted plug without external threads.

It is another object of the present invention to provide a better flush-mounted plug that can be fitted in an unused hole easily and quickly.

The above objects and other related objects are realized by providing a resin flush-mounted plug for insertion into a countersunk hole having an internally threaded portion. The resin flush-mounted plug includes a head for filling the countersink of the hole and a plurality of legs integrally formed with the head for fitting into the internally threaded portion of the countersunk hole, each of the legs having a fixed end and a free end. In the flush-mounted plug, the outer peripheral surfaces of the fixed ends of the legs are arranged on a circumference whose diameter is smaller than the inner diameter of the internally threaded portion of the countersunk hole while the outer peripheral surfaces of the free ends of the legs are arranged on a circumference whose diameter is larger than the inner diameter of the internally threaded portion and smaller than the outer diameter of the countersink of the hole.

In one aspect of the present invention, each of the legs has a chamfer at the outer bottom edge thereof.

In another aspect of the present invention, the legs project outward radially from the underside of the head, such that the legs, when fitted in the internally threaded portion of the hole, press against the internally threaded portion by the restoring force of the resin legs, thereby preventing the flush-mounted plug from coming out of the countersunk hole.

In another aspect of the present invention, the number of legs are in the range from two to four.

In still another aspect of the present invention, the head has a recess formed therein for accommodating a tool used to remove the plug from the countersunk hole, whereby through rotation of a tool fitted in the recess of the plug, the internally threaded portion of the hole cuts threads in the resin legs as the plug is rotated, thus unscrewing the plug out of the hole.

The invention further provides for a resin flush-mounted plug for insertion into a stepped hole that includes an internally threaded portion having an opening and a large-diameter portion formed on the opening of the internally threaded portion. The flush-mounted plug includes a head for filling the large-diameter portion of the stepped hole; a plurality of legs integrally formed with the head for fitting into the internally threaded portion of the stepped hole, each of the legs having a fixed end and a free end; and a plurality of guides integrally formed with the head for being engaged in the large-diameter portion so as to guide the free ends of the legs to the opening of the internally threaded portion. In this flush-mounted plug, the outer peripheral surfaces of the fixed ends of the legs are arranged on a circumference whose diameter is smaller than the inner diameter of the internally threaded portion of the stepped hole while the outer peripheral surfaces of the free ends of the legs are arranged on a circumference whose diameter is larger than the inner diameter of the internally threaded portion of the stepped hole.

In one aspect of the present invention, each of the legs has a chamfer at the outer bottom edge thereof.

In still another aspect of the present invention, the legs project outward radially from the underside of the head, such that the legs, when fitted in the internally threaded portion of the stepped hole, are pressed against the internally threaded portion by the restoring force of the resin legs, thereby preventing the flush-mounted plug from coming out of the stepped hole.

In yet another aspect of the present invention, the head has a recess formed therein for accommodating a tool which is used to remove the plug from the stepped hole, whereby through rotation of a tool fitted in the recess of the plug, the internally threaded portions of the stepped hole cuts threads in the resin legs as the plug is rotated, thus unscrewing the plug out of the stepped hole.

In a preferred mode, the number of legs are in the range from two to four.

Preferably, the flush-mounted plug is provided with the same number of legs and guides.

In one practice, the legs and the guides are concentrically arranged on the under surface of the head in a staggered configuration, with the guides located outside the legs.

In another practice, each leg comprises a straight portion on the fixed end and a radially flared portion on the free end.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

Preferred embodiments of the present invention will be explained with reference to the attached drawings.

First Embodiment

Figure 1:
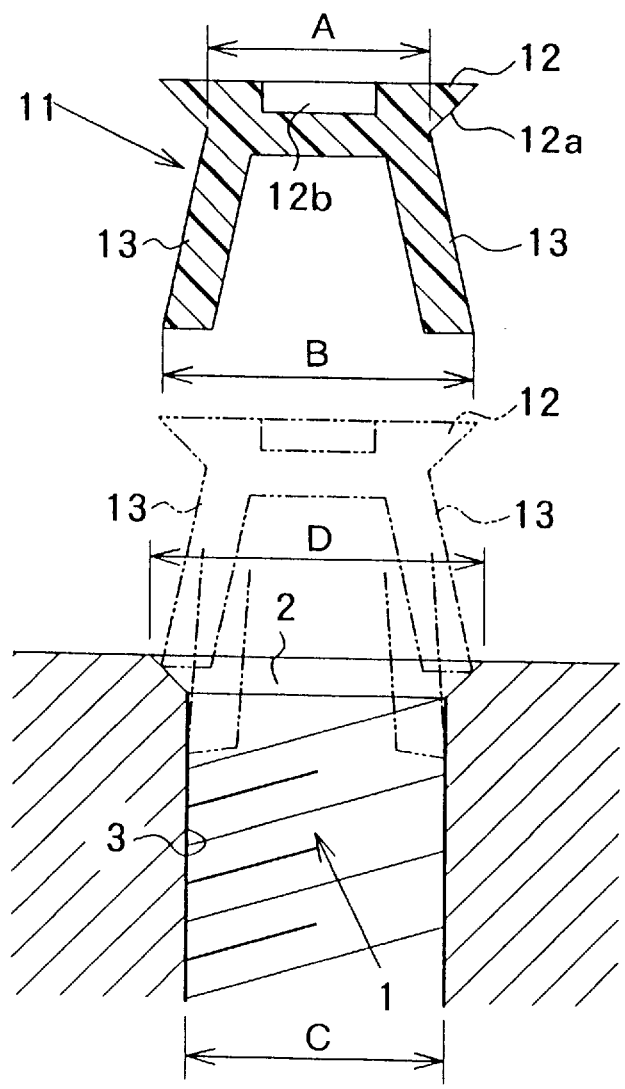
FIG. 1 is a cross sectional view of a flush-mounted plug of a first embodiment in accordance with the present invention for filling the threaded hole shown below the plug.
Figure 2:
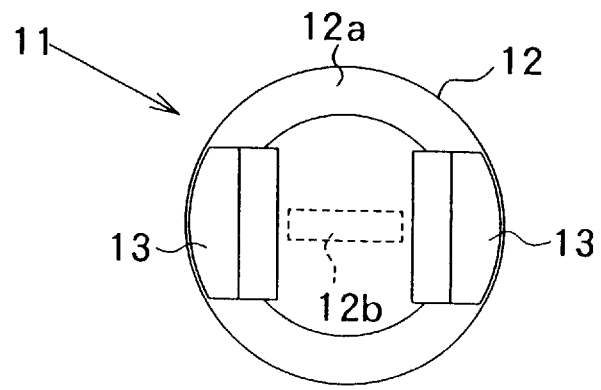
FIG. 2 is a bottom plane view of the flush-mounted plug of FIG. 1.

FIGS. 1 and 2 show a resin flush-mounted plug 11 according to the invention for insertion into a threaded hole 1 with a countersink 2 formed in a pallet of a machine tool. The flush-mounted plug 11 includes a head 12 for filling the countersink 2 of the threaded hole 1 and a pair of legs 13 formed integrally with the head 12 for plugging an internally threaded portion 3 of the countersunk hole 1. Each leg 13 has a proximal, fixed end and a distal, free end.

The head 12 has a tapered under surface 12a that fits the countersink 2 of the threaded hole 1. Also provided in the head 12 is a slot 12b, a hexagonal hole, or some other recess into which a screwdriver blade, a wrench, or some other appropriate tool is inserted when the flush-mounted plug 11 is to be removed from the hole. The legs 13 project outward radially from the underside of the head 12. As shown in FIG. 1, the outer peripheral surfaces of the fixed ends of the legs 13 are arranged on a circumference whose diameter is smaller than the inner diameter C of the internally threaded portion 3 (A<C with A being the diameter of the circumference). Furthermore, the outer peripheral surfaces of the free ends of the legs are arranged on a circumference whose diameter is larger than the inner diameter C of the internally threaded portion 3 and smaller than the outer diameter D of the countersink 2 (C<B<D with B being the diameter of the circumference).

To insert the flush-mounted plug 11 into the threaded hole 1, the free ends of the legs are first placed in the countersink 2. Secondly, the head 12 is lightly tapped with a soft-headed hammer or some other appropriate tool, whereupon the legs 13 slide inwardly on the countersink surface and elastically deform, thereby entering the internally threaded portion 3 of the hole. Upon filling the internally threaded portion 3, the legs 13 tightly and securely fit the internally threaded portion 3 due to the restoring force of the legs 13. At the same time, the head 12 closes the countersink 2 to present a surface flush with the pallet. According to this embodiment, therefore, no threads need be formed on the legs 13 in the manufacturing stage. Additionally, the resin flush-mounted plug 11 can be made easily and cheaply in a simply structured mold. Moreover, the plug can be quickly and easily driven into a hole 1 with only a light hammer blow.

To remove the plug 11 from the hole 1, a tool (not shown) is fitted in the slot 12b of the head 12 and turned in such a direction as to cause the plug to be unscrewed. As the plug is turned, threads are cut in the legs 13 by the external threaded portion 3 of the hole 1, thus easily unscrewing the plug 11 from the hole 1. Alternatively, in order to save time, when the head 12 is sufficiently raised from the opening of the countersink 2 by rotation, the elastic legs 13 can be pinched inwardly by hand or with some other suitable tool and pulled out of the tool.

Figure 3:
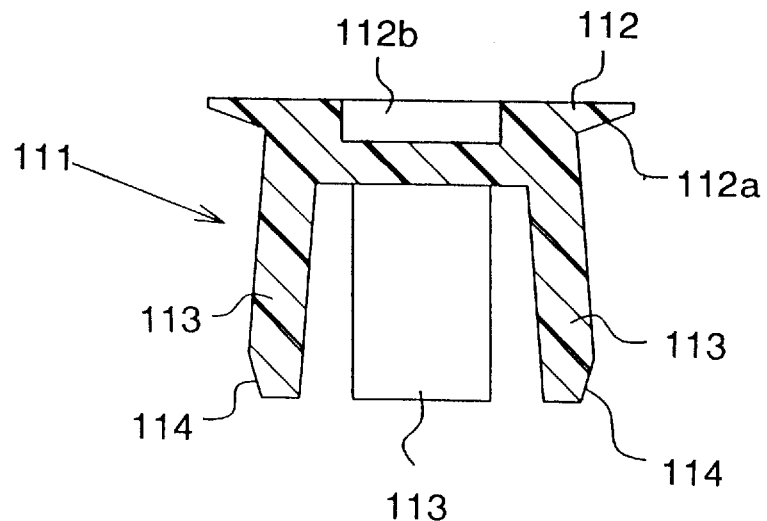
FIG. 3 is a modification of the flush-mounted plug of FIG. 1.
Figure 4:
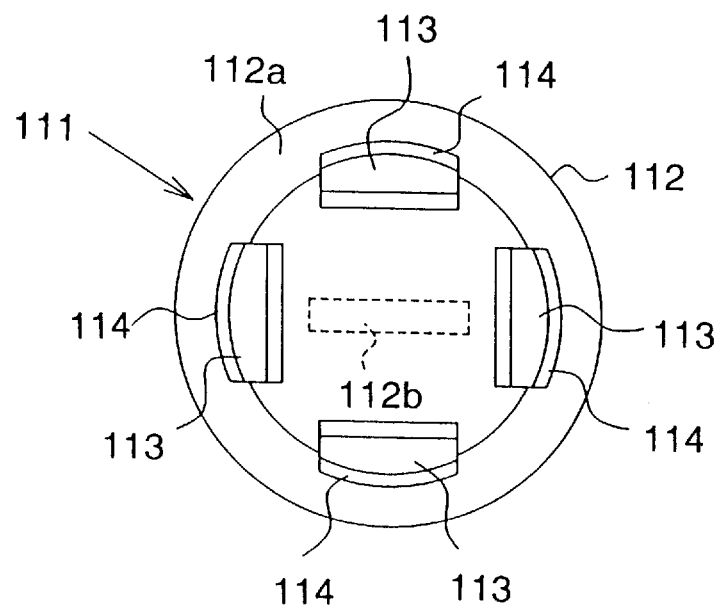
FIG. 4 is a bottom plane view of the flush-mounted plug of FIG. 3.

FIGS. 3 and 4 show a modified plug 111 of the resin flush-mounted plug 11 of the first embodiment. Accordingly, since like reference characters are used to designate like or corresponding parts throughout the drawings, the description of some parts is hereby dispensed with. The flush-mounted plug 111 includes a head 112 similar to that of the plug 11 and three legs 113, each having a chamfered outer bottom edge 114. By easily sliding along the countersink 2 of the hole, the chamfered edges 114 facilitate insertion of the flush-mounted plug 61 into the threaded hole 1.

Second Embodiment

Figure 5:
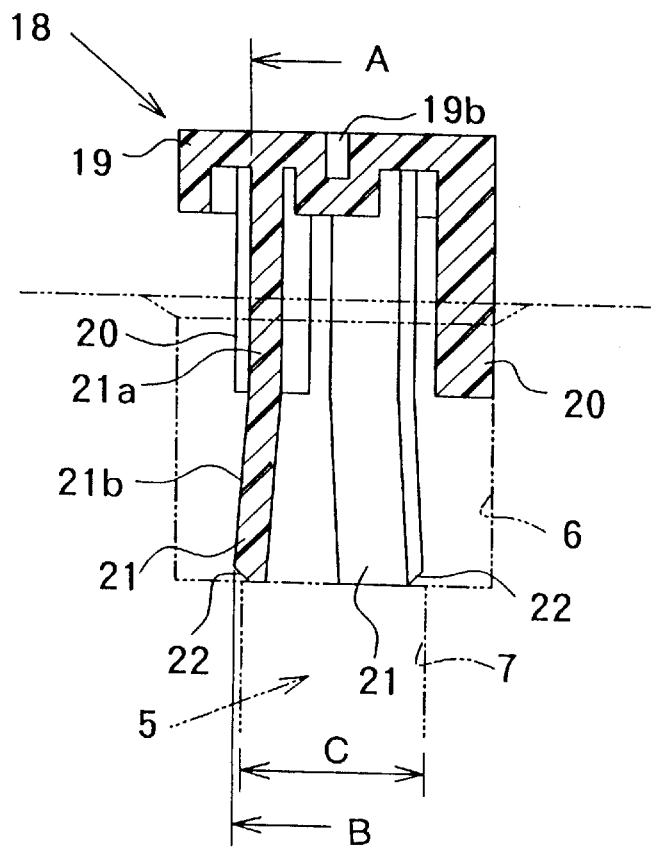
FIG. 5 is a cross sectional view of a stepped flush-mounted plug of a second embodiment in accordance with the present invention for filling the threaded hole shown below the plug.
Figure 6:
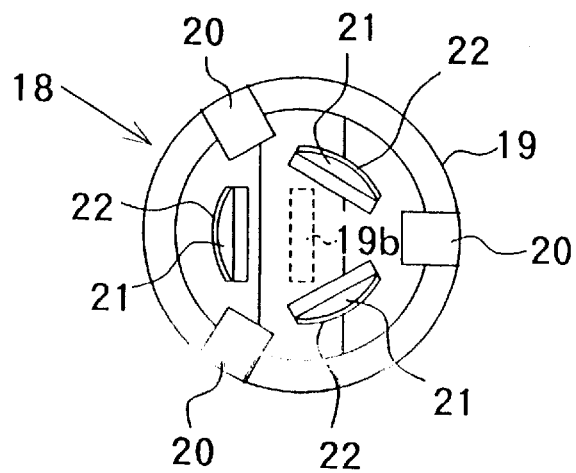
FIG. 6 is a bottom plane view of the stepped flush-mounted plug of FIG. 5.

FIGS. 5 and 6 show an alternate resin flush-mounted plug 18 of the second embodiment for insertion into a stepped threaded hole 5 formed in a pallet of a machine tool. The flush-mounted plug 18 includes a head 19 for filling a large-diameter portion 6 of the threaded hole 5 and three legs 21 integrally formed with the head 19 for fitting into an internally threaded portion 7 of the threaded hole 1. Each leg 21 has a proximal fixed end and a distal free end. The flush-mounted plug 18 further includes three guide lugs 20 also integrally formed with the head 19 such that when the guide lugs 20 engage the large-diameter portion 6 of the threaded hole 5, the guide lugs 20 guide the legs 21 to the opening of the internally threaded portion 7 of the hole 1 (see FIG. 5).

The legs 21 and the guide lugs 20 are concentrically arranged on the under surface of the head 19 in a staggered configuration with the guide lugs 20 located outside the circumference described by the legs 21. Each leg 21 comprises a straight portion 21a on the fixed end and an outwardly radially flared portion 21b on the free end. As shown in FIG. 5, the outer peripheral surfaces of the straight portions 21a are arranged on a circumference whose diameter is smaller than the inner diameter C of the internally threaded portion 7 (A<C with A the diameter of the circumference). Furthermore, the outer peripheral surfaces of the free ends of the radially flared portions 21b are arranged on a circumference whose diameter is larger than the inner diameter C of the internally threaded portion 7 (C<B with B the diameter of the circumference).

Additionally, each of the radially flared portions 21b has a chamfered outer bottom edge 22 for positioning the flared portions 21b with respect to the internally threaded portion 7 of the hole. More particularly, when installing the plug 18 in the hole, the lugs 20 guide the chamfered outer bottom edges 22 until they come into contact with the opening of the internally threaded portion 7. Upon this positioning, the head 19 of the plug is lightly tapped with a soft hammer or some other appropriate tool. Then, sliding inwardly along the countersink surface, the legs 21 are elastically deformed and smoothly inserted into the internally threaded portion 7 of the hole 5. Upon filling the internally threaded portion 7, the legs 21 tightly and securely fit in the hole due to the restoring force of the legs 21. At the same time, the head 19 closes the large-diameter portion 6 of the internally threaded portion 7. According to this embodiment, therefore, no threads need be formed in the manufacturing stage on the legs 21, either.

To remove the plug 18 from the hole 5, a tool (not shown) is fitted in the slot 19b of the head 19 and turned in such a direction as to cause the plug to be unscrewed, in the same manner as described above regarding the first embodiment.

Figure 7:
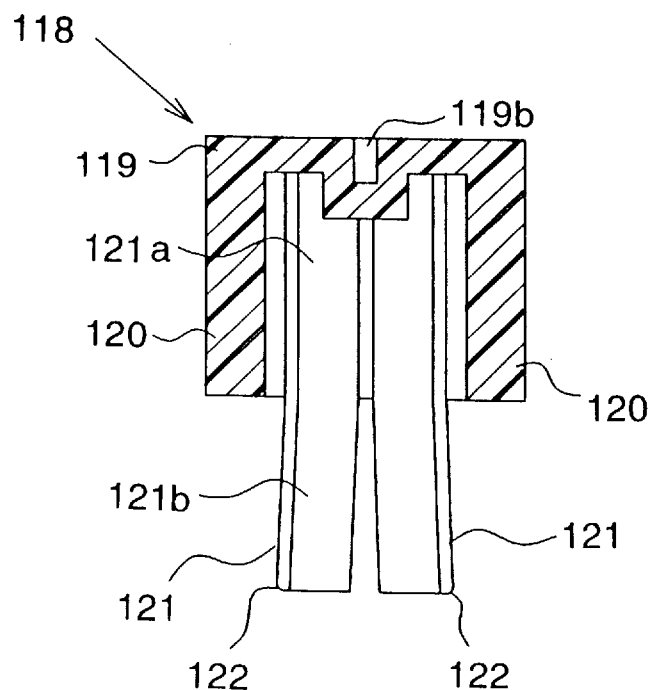
FIG. 7 is a modification of the stepped flush-mounted plug of FIG. 5.
Figure 8:
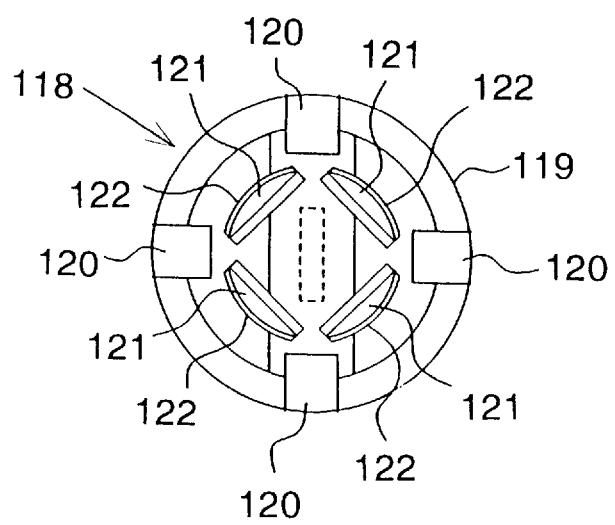
FIG. 8 is a bottom plane view of the stepped flush-mounted plug of FIG. 7.
Figure 9:
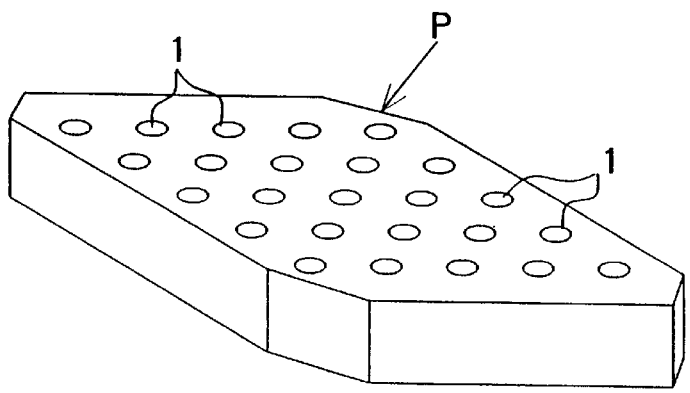
FIG. 9 is a perspective view of a pallet of a machine tool.
Figure 10:
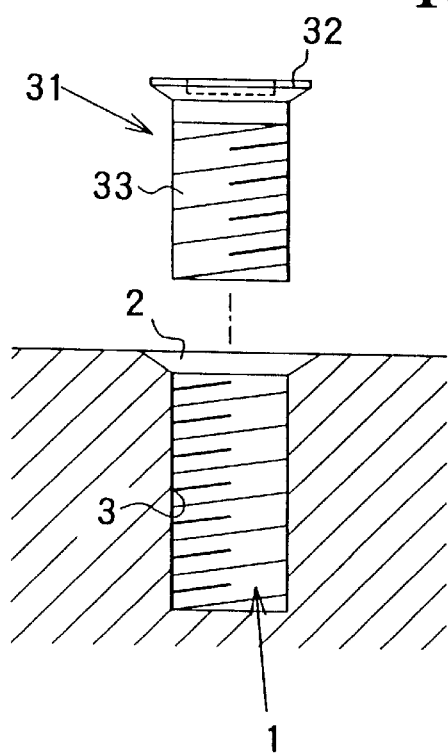
FIG. 10 is a cross sectional view of a conventional flush-mounted plug for filling in the threaded hole shown below the plug.
Figure 11:
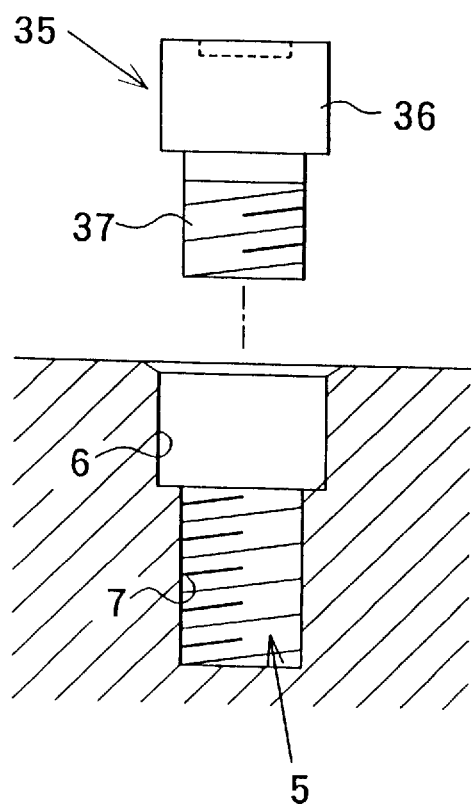
FIG. 11 is a cross sectional view of a conventional stepped flush-mounted plug for filling in the threaded hole shown below the plug.

FIGS. 7 and 8 show an modified plug 118 of the resin flush-mounted plug 18 of the second embodiment. The plug 118 is identical in construction and function to that of the second embodiment, except that the flush-mounted plug 118 is provided with four legs and guide lugs instead of three. Thus, since like reference characters designate like or corresponding parts throughout the drawings, the description thereof is hereby dispensed with.

As any number of further modifications, alterations, and changes are possible without departing from the scope or spirit of the essential characteristics of the present invention, it is to be understood that the above embodiment is only an illustration and not restrictive in any sense. The scope or spirit of the present invention is limited only by the terms of the appended claims. For example, the number and/or the shape of the legs and/or the guide lugs can be changed to suit particular applications.

What is claimed is:

1. A combination comprising:
   a surface having a countersunk hole formed therein, the countersunk hole having an internally threaded portion formed by a plurality of threads, and
   a resin flush-mounted plug for insertion into the countersunk hole, the plug including
      a head for filling the countersink of the hole, the head having a recess formed therein for accommodating a tool used to remove the plug from the countersunk hole; and
      a plurality of legs integrally formed with the head for fitting into the internally threaded portion of the countersunk hole, each of the legs having a fixed end and a free end, wherein the outer peripheral surfaces of the fixed ends of the legs are arranged on a circumference whose diameter is smaller than the inner diameter of the internally threaded portion of the countersunk hole while the outer peripheral surfaces of the free ends of the legs are arranged on a circumference whose diameter is larger than the inner diameter of the internally threaded portion and smaller than the outer diameter of the countersink of the hole, the threads forming the threaded portion of the countersunk hole having a hardness sufficient to cut threads in the resin legs as the plug is rotated by the tool.

2. A resin flush-mounted plug for insertion into a stepped hole including an internally threaded portion having an opening and a large-diameter portion formed on the opening of the internally threaded portion, comprising:
   a head for filling the large-diameter portion of the stepped hole;
   a plurality of legs integrally formed with the head for fitting into the internally threaded portion of the stepped hole, each of the legs having a fixed end and a free end; and
   a plurality of guides integrally formed with the head for being engaged in the large-diameter portion so as to guide the free ends of the legs to the opening of the internally threaded portion, wherein the outer peripheral surfaces of the fixed ends of the legs are arranged on a circumference whose diameter is smaller than the inner diameter of the internally threaded portion of the stepped hole while the outer peripheral surfaces of the free ends of the legs are arranged on a circumference whose diameter is larger than the inner diameter of the internally threaded portion of the stepped hole.

3. The flush-mounted plug in accordance with claim 2 wherein each of the legs has a chamfer at the outer bottom edge thereof.

4. The flush-mounted plug in accordance with claim 2 wherein the legs project outward radially from the underside of the head, such that the legs, when fitted in the internally threaded portion of the stepped hole, press against the internally threaded portion by the restoring force of the resin legs, thereby preventing the flush-mounted plug from coming out of the stepped hole.

5. The flush-mounted plug in accordance with claim 6 wherein the head has a recess formed therein for accommodating a tool which is used to remove the plug from the stepped hole, whereby the threads forming the threaded portion of the stepped hole have a hardness sufficient to cut threads in the resin legs as the plug is rotated by the tool.

6. The flush-mounted plug in accordance with claim 2 wherein the number of legs are in the range from two to four.

7. The flush-mounted plug in accordance with claim 2 wherein the flush-mounted plug is provided with the same number of legs and guides.

8. The flush-mounted plug in accordance with claim 7 wherein the legs and the guides are concentrically arranged on the under surface of the head in a staggered configuration, with the guides located outside the legs.

9. The flush-mounted plug in accordance with claim 2 wherein each leg comprises a straight portion on the fixed end and a radially flared portion on the free end.

10. A combination comprising:
    a surface having a countersunk hole formed therein, the countersunk hole having an internally threaded portion, and
    a resin flush-mounted plug for insertion into the countersunk hole, the plug including
       a head for filling the countersink of the hole; and
       a plurality of legs integrally formed with the head for fitting into the internally threaded portion of the countersunk hole, each of the legs having a fixed end and a free end, wherein the outer peripheral surfaces of the fixed ends of the legs are arranged on a circumference whose diameter is smaller than the inner diameter of the internally threaded portion of the countersunk hole while the outer peripheral surfaces of the free ends of the legs are arranged on a circumference whose diameter is larger than the inner diameter of the internally threaded portion and smaller than the outer diameter of the countersink of the hole.

11. The combination in accordance with claim 10 wherein each of the legs of the plug has a chamfer at the outer bottom edge thereof.

12. The combination in accordance with claim 10 Wherein the legs of the plug project outward radially from the underside of the head, such that the legs, when fitted in the internally threaded portion of the hole, press against the internally threaded portion by the restoring force of the resin legs, thereby preventing the flush-mounted plug from coming out of the countersunk hole.

13. The combination in accordance with claim 10 wherein the number of legs of the plug are in the range from two to four.

* * * * *